(12) United States Patent
Gregory

(10) Patent No.: US 11,122,916 B2
(45) Date of Patent: Sep. 21, 2021

(54) ADJUSTABLE ROTATING ASSEMBLY

(71) Applicant: Quenetics, LLC, Baltimore, MD (US)

(72) Inventor: Brown Gregory, Baltimore, MD (US)

(*) Notice: Subject to any disclaimer, the term of this patent is extended or adjusted under 35 U.S.C. 154(b) by 127 days.

(21) Appl. No.: 16/661,878

(22) Filed: Oct. 23, 2019

(65) Prior Publication Data
US 2021/0120979 A1  Apr. 29, 2021

(51) Int. Cl.
| | |
|---|---|
| *A47F 5/04* | (2006.01) |
| *A47F 5/02* | (2006.01) |
| *A47F 5/00* | (2006.01) |
| *A47F 5/05* | (2006.01) |
| *A47F 5/06* | (2006.01) |
| *A47B 49/00* | (2006.01) |

(52) U.S. Cl.
CPC ............ *A47F 5/04* (2013.01); *A47B 49/004* (2013.01); *A47F 5/0037* (2013.01); *A47F 5/02* (2013.01); *A47F 5/05* (2013.01); *A47F 5/06* (2013.01)

(58) Field of Classification Search
CPC ...... A47F 5/04; A47F 5/02; A47F 5/05; A47F 5/106; A47F 3/10; A47F 5/0037; A47F 5/0087; A47F 5/06; D06F 57/04; D06F 57/02; A47B 49/00; A47B 49/004; A47B 2063/005
USPC ..... 211/196, 144, 205, 163, 166; 248/218.4, 248/219.4, 125.7, 131, 415; 108/94, 95, 108/139, 141, 150, 105
See application file for complete search history.

(56) References Cited

U.S. PATENT DOCUMENTS

| | | | | |
|---|---|---|---|---|
| 37,070 A | * | 12/1862 | Crawford | A47B 11/00 108/94 |
| 317,443 A | * | 5/1885 | Cunningham | A47F 5/0037 211/77 |
| 670,144 A | * | 3/1901 | Bond | F16M 11/00 248/125.3 |
| 699,154 A | * | 5/1902 | De Force | A01G 9/022 47/39 |
| 1,788,096 A | * | 1/1931 | Friedemann | A47F 5/04 108/96 |
| 2,198,459 A | * | 4/1940 | Potts | A47F 5/04 206/561 |
| 2,281,849 A | | 5/1942 | McCoppin | |
| 2,447,924 A | * | 8/1948 | Vitale | A47G 25/0664 211/205 |
| 2,913,126 A | | 11/1959 | Thompson | |
| 3,021,960 A | * | 2/1962 | Pipe | A47B 13/06 211/205 |
| 3,023,912 A | * | 3/1962 | Sebastian | D06F 57/04 211/196 |
| 3,035,707 A | | 5/1962 | Thompson | |
| 3,035,708 A | * | 5/1962 | Freeman | A47B 96/1425 211/107 |
| 3,080,067 A | * | 3/1963 | Lind | A47F 5/04 211/190 |

(Continued)

*Primary Examiner* — Jennifer E. Novosad

(57) ABSTRACT

An assembly for storage, display, and serving includes accessories attached to a rotating column. The column is supported by a base, which has a turntable bearing. The stationary ring of the bearing rests on a surface, while the rotating ring is attached to the base and allows the assembly to rotate. The accessories can attach directly to the column, or they can slide onto a bracket which attaches to the column. The accessories may comprise platforms for serving, mug holders, coffee cup holders, storage containers, or various other kitchen accessories.

18 Claims, 5 Drawing Sheets

(56) References Cited

U.S. PATENT DOCUMENTS

| | | | | |
|---|---|---|---|---|
| 3,158,264 A * | 11/1964 | Bittner | A47F 5/06 | 108/105 |
| 3,195,736 A * | 7/1965 | Bomar, Jr. | A47F 5/05 | 211/163 |
| 3,283,913 A | 11/1966 | Vanhorn, Jr. | | |
| 3,315,819 A * | 4/1967 | Kingsbery | A47F 5/04 | 211/163 |
| 3,358,621 A * | 12/1967 | Szacsko | A47F 5/06 | 108/92 |
| 3,612,287 A * | 10/1971 | Maltese | A47F 5/04 | 52/298 |
| 3,645,404 A | 2/1972 | Hansen | | |
| 3,679,164 A * | 7/1972 | Bard | A47F 5/04 | 248/243 |
| 3,701,437 A * | 10/1972 | Spiik | A47F 5/02 | 211/144 |
| 3,923,277 A * | 12/1975 | Perrault | H02G 3/0456 | 248/49 |
| 4,126,366 A * | 11/1978 | Handler | A47F 5/02 | 108/152 |
| 4,192,424 A * | 3/1980 | Allsop | A47B 57/567 | 211/37 |
| 4,262,439 A * | 4/1981 | Dinan | A47B 57/265 | 211/128.1 |
| 4,433,885 A | 2/1984 | Baker | | |
| 4,688,685 A * | 8/1987 | Brace | A63C 11/028 | 211/60.1 |
| 4,708,408 A * | 11/1987 | Kennon | A47B 49/00 | 206/576 |
| 4,807,837 A * | 2/1989 | Gawlik | A61M 5/1415 | 211/196 |
| 4,865,283 A * | 9/1989 | Parker | A47F 5/04 | 248/159 |
| 5,080,311 A | 1/1992 | Engstrom | | |
| 5,178,286 A * | 1/1993 | Allison, III | A47F 5/06 | 211/205 |
| 5,379,885 A * | 1/1995 | Chen | B25H 3/04 | 206/216 |
| 5,746,334 A | 5/1998 | Brandenberg | | |
| 5,947,306 A * | 9/1999 | Chang | A47G 7/041 | 211/85.23 |
| 6,138,842 A * | 10/2000 | Rios | A47F 5/06 | 211/133.4 |
| 6,234,331 B1 | 5/2001 | Brandenberg | | |
| 6,419,332 B1 * | 7/2002 | Caldwell, Jr. | A47B 49/00 | 312/125 |
| 6,505,749 B1 * | 1/2003 | Panetta | A47B 96/025 | 211/163 |
| 6,520,352 B2 | 2/2003 | Mondragon | | |
| 6,766,914 B1 * | 7/2004 | Rios | A47F 5/06 | 211/133.4 |
| 6,802,481 B2 | 10/2004 | Newburn | | |
| 6,905,020 B2 * | 6/2005 | Chang | B25H 3/025 | 206/349 |
| 7,458,475 B2 | 12/2008 | Ho | | |
| 7,584,973 B2 * | 9/2009 | Brager | B25H 3/026 | 108/141 |
| 8,083,080 B2 * | 12/2011 | Li | A01N 1/0242 | 211/163 |
| 8,210,373 B2 * | 7/2012 | Liao | A47F 5/02 | 211/131.1 |
| 8,240,488 B2 | 8/2012 | Huang | | |
| 8,302,919 B1 | 11/2012 | McGrath | | |
| 8,544,390 B1 * | 10/2013 | Bahnsen | A47G 23/08 | 108/94 |
| 8,915,391 B2 * | 12/2014 | Radow | A47G 19/00 | 220/23.83 |
| 9,492,020 B1 * | 11/2016 | Morrell | A47F 5/0018 | |
| 9,782,020 B2 * | 10/2017 | Bacon | A47F 5/06 | |
| 10,219,605 B1 * | 3/2019 | Love | A47B 96/1483 | |
| 2004/0061419 A1 * | 4/2004 | Gallea | A47B 57/18 | 312/238 |
| 2005/0076817 A1 | 4/2005 | Boks | | |
| 2007/0175848 A1 * | 8/2007 | Mallen | A47G 25/0671 | 211/196 |
| 2008/0061020 A1 * | 3/2008 | Kaisler | A47B 31/02 | 211/196 |
| 2008/0197087 A1 * | 8/2008 | Hunter | A47F 5/025 | 211/1.53 |
| 2009/0159543 A1 * | 6/2009 | Burgess | A47B 87/0207 | 211/144 |
| 2009/0230069 A1 * | 9/2009 | Naden | A47B 96/025 | 211/144 |
| 2011/0089127 A1 | 4/2011 | Thomas | | |
| 2011/0220599 A1 * | 9/2011 | Siahpush | A47G 23/0616 | 211/85.4 |
| 2012/0199706 A1 * | 8/2012 | Robbins, III | A47F 5/02 | 248/159 |
| 2014/0110555 A1 * | 4/2014 | Maddux | A47F 5/06 | 248/558 |
| 2014/0263882 A1 * | 9/2014 | Kull | A47F 5/06 | 248/125.3 |
| 2015/0275160 A1 * | 10/2015 | Hansmann | C12C 13/10 | 99/278 |
| 2017/0354273 A1 * | 12/2017 | Wilke | A47F 5/04 | |

\* cited by examiner

ADJUSTABLE ROTATING ASSEMBLY

CROSS-REFERENCE

Not applicable.

TECHNOLOGICAL FIELD

The present invention relates to storage, display, and food serving systems.

BACKGROUND

Rotating serving systems are manufactured with a varying number of trays on which food may be served. Systems for attaching trays to a rotating central column have also been developed.

A disadvantage of present day food servers arises when the food server takes up too much table or counter space. When too many platforms or trays are attached at one height, a great deal of table space is taken up, leaving less room for plates. Another disadvantage arises when trays are fixed to brackets that attach to the column, since adjusting such an assembly is difficult to impossible.

DETAILED DESCRIPTION

The present invention will now be described in more detail with reference to the accompanying drawings. The accompanying drawings show exemplary embodiments of the invention. The invention may, however, be embodied in many different forms and should not be construed as limited to the embodiments set forth herein.

The object of the present invention is to overcome the deficiencies in the prior art by providing cantilevered support brackets that attach to a rotating column via male/female attachment features, along with separately attachable modular accessories. The present invention offers an easy to use system for attaching accessories to various heights or tiers on a rotating column.

Figure 1:
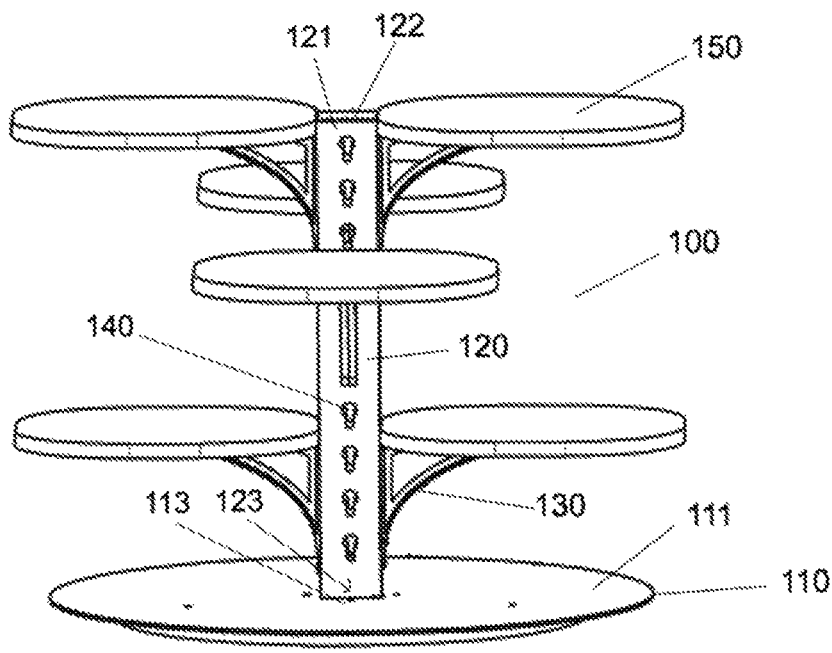
FIG. 1 is a side perspective view of an embodiment of the assembly.

Referring to FIG. 1, an assembly 100 comprises a base 110 and a column 120 in the illustrated embodiment. The base 110 may be made of stainless steel, rolled steel, aluminum, or of any other appropriate material as understood by a those of ordinary skill in the art. The column 120 may also be made of stainless steel, rolled steel, aluminum, or of any other appropriate material as understood by a those of ordinary skill in the art. The column 120 can be fixed or removably attached to the base 110. The base 110 comprises a top face 111 and a bottom face 112 (shown in FIG. 2). Here, the column 120 is shown as a hollow rectangular prism with four vertical side walls of equal width. In an embodiment, the column 120 is seventeen (17) inches tall. However, the column 120 could be any other height. Similarly, the base 110 may be a circle of twenty (20) inches in diameter, but could be any other diameter. The base may also be any other shape, such as a square. In other embodiments, the column 120 comprises other polygonal prisms, such as a triangular prism with three vertical side walls or a pentagonal prism with five vertical side walls. In another embodiment, the column 120 comprises a cylinder. The top end 121 of the column 120 may be sealed with a cap 122. The bottom end 123 of the column 120 may extend through a central opening 113 in the base 110. In another embodiment, the column 120 comprises one vertical wall, rather than a hollow prism. In yet another embodiment, the column is a solid, rather than being hollow. In this latter embodiment, a cap 122 is therefore not necessary.

Brackets 130 may attach to the column 120 at attachment points 140. The brackets 130 may be cantilever-braced. The brackets 130 may be made of plastic, or of any other appropriate material as understood by a those of ordinary skill in the art. In an exemplary embodiment, the attachment points 140 on the column 120 comprise key-hole shaped slots. Accessories 150 may attach to the brackets 130. The accessories 150 can be fixed or removably attached to the brackets 130.

Figure 2:
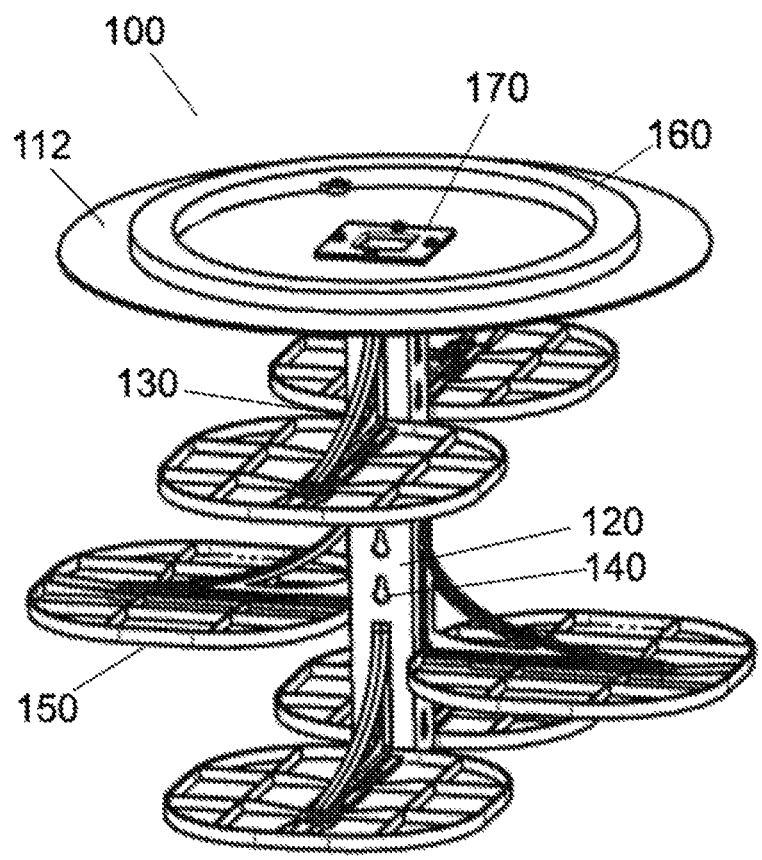
FIG. 2 is an underside perspective view of an embodiment of the assembly.

Referring now to the embodiment of FIG. 2, a turntable bearing 160 is attached to the bottom face 112 of the base 110. The turntable bearing 160 may comprise a rotating ring (not shown) attached to the bottom face 112 and a fixed ring (also not shown) that can rest on a surface, such as a countertop or table. Rolling elements may be located between the rotating ring and the fixed ring. A plug 170 may connect the column 120 to the bottom face 112 of the base 110.

Figure 3:
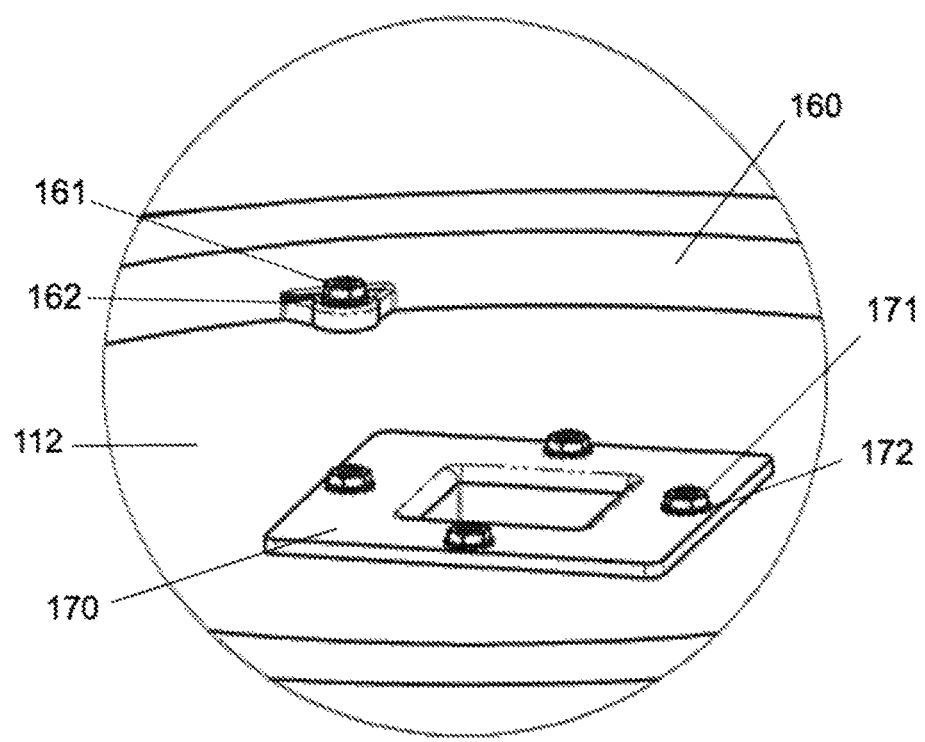
FIG. 3 is a close-up underside view an embodiment of the assembly, showing the plug and the turntable bearing attached to the bottom face of the base.

Referring now to the embodiment of FIG. 3, the plug 170 can be attached to the bottom face 112 of the base 110 via nuts 171 and tooth lock washers 172. Similarly, the rotating ring of the turntable bearing 160 can be attached to the bottom face 112 of the base 110 via nuts 161 and chamfered washers 162. In other embodiments, the plug 170 and the turntable bearing 160 are attached to the bottom face 112 of the base 110 by any other appropriate fastening means as would be understood by those of ordinary skill in the art.

Figure 4:
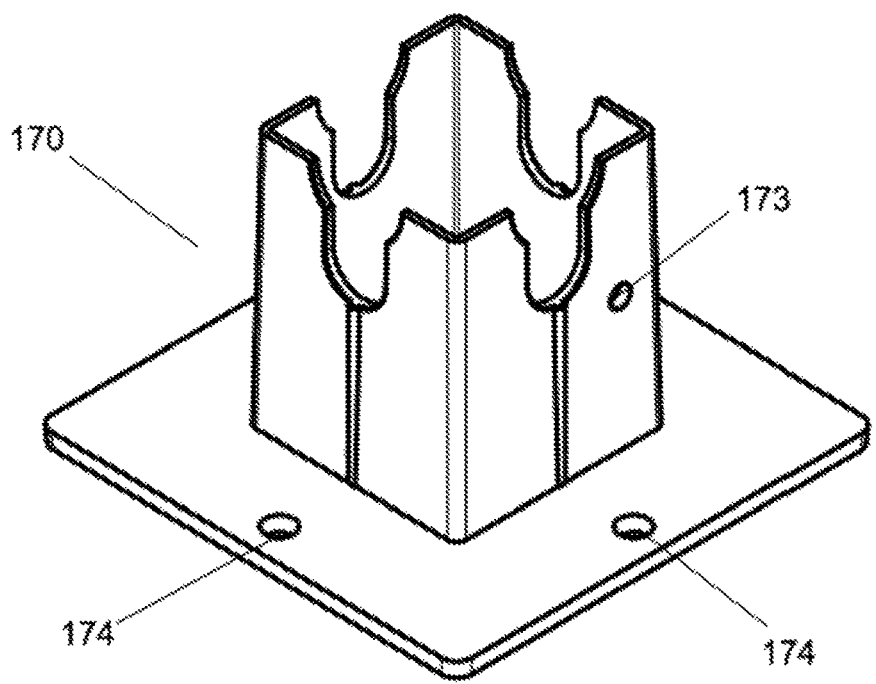
FIG. 4 is a close-up perspective view of the plug showing the plug support hole and the plug connection holes, according to an embodiment.

Referring now to the embodiment of FIG. 4, the plug 170 comprises a plug support hole 173. The plug support hole 173 lines up with the column support hole 124 (shown in FIG. 6). A screw or any other appropriate fastening means then passes through both the plug support hole 173 and the column support hole 124 to stabilize the column 120. Plug connection holes 174 in the plug 170 align with base connection holes 114 (shown in FIG. 5). The plug 170 can then be attached to the bottom face 112 of the base 110 via nuts 171 and tooth lock washers 172. In alternative embodiments, the plug may be attached to the base by any other appropriate fastening means as would be understood by those of ordinary skill in the art.

Figure 5:
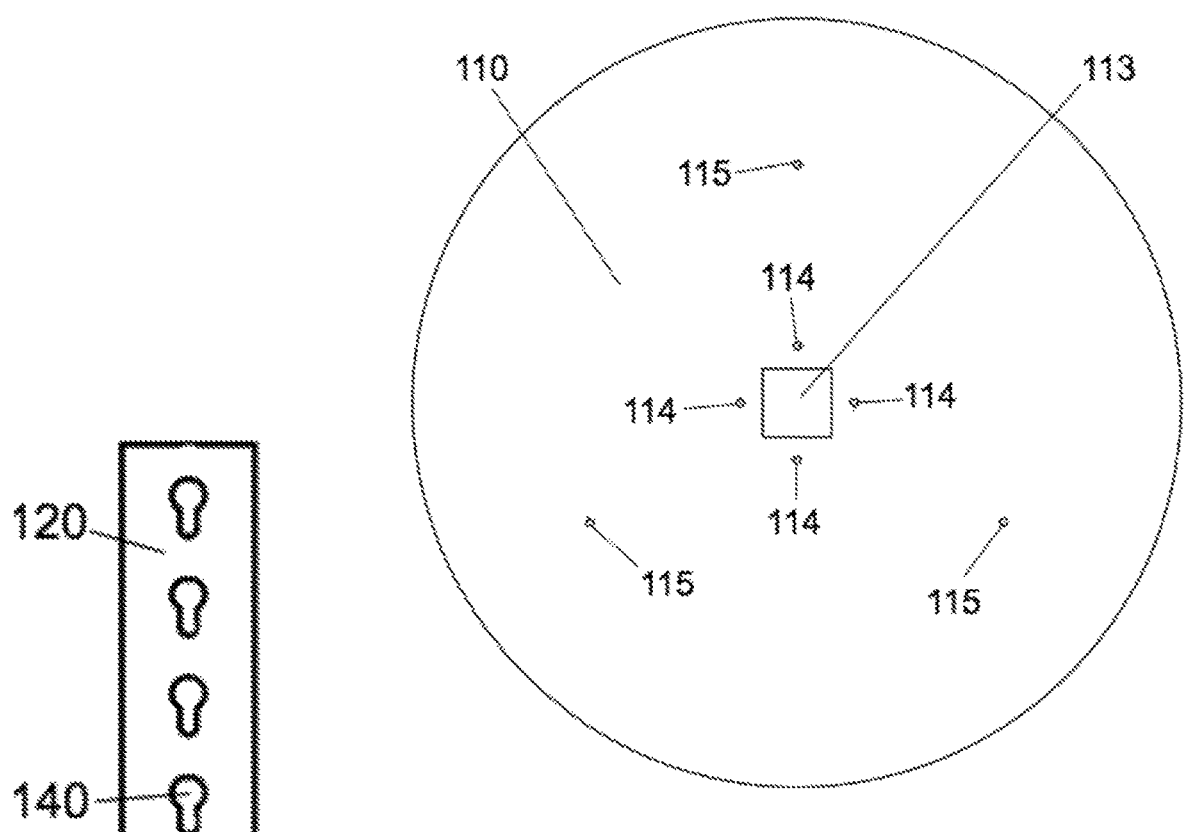
FIG. 5 is a bird's eye view of the base, showing the base connections holes, bearing connection holes, and central opening, according to an embodiment.

Referring now to the embodiment of FIG. 5, the base 110 comprises base connection holes 114 surrounding the central opening 113. The base connection holes 114 align with the plug connection holes 174 (shown in FIG. 4). In the exemplary embodiment, the central opening 113 may be a square to accommodate a column 120 shaped as a rectangular prism. Four base connection holes 114 may surround the central opening 113—one on each side. In other embodiments, the column 120 may comprise another polygonal prism. For example, a column 120 shaped as a triangular prism would require a triangular central opening 113 and three base connection holes 114. The plug 170 would also be triangular-shaped. Bearing connection holes 115 in the base 110 align with holes in the turntable bearing 160 and receive nuts 161 and chamfered washers 162 to fasten the turntable bearing 160 to the bottom face 112 of the base 110.

Figure 6:
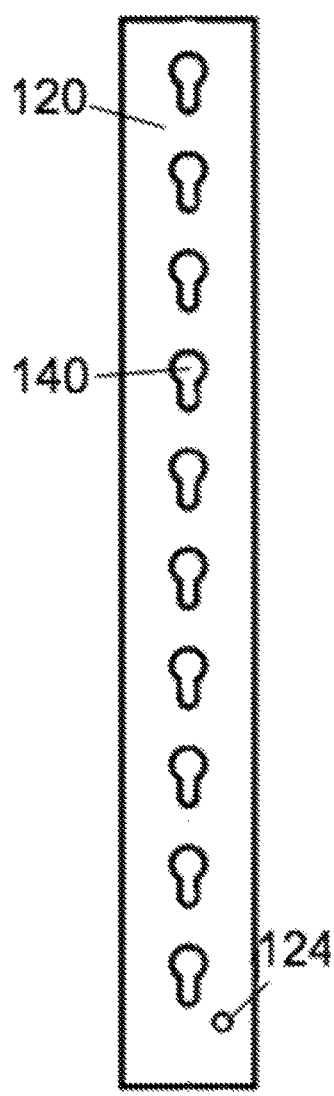
FIG. 6 is a side view of the column showing the plurality of attachment points and the column support hole, according to an embodiment.

Referring now to the embodiment of FIG. 6, the column 120 comprises a plurality of attachment points 140. In the exemplary embodiment, the plurality of attachment points 140 comprises a plurality of female slots in the column and at least one male peg on the bracket (shown in FIG. 7). The male peg is configured to attach the bracket 130 to the column 120 by insertion into one of the plurality of female slots. In another embodiment, the plurality of attachment points 140 comprises a plurality of male pegs on the column 120 and a female slot on the bracket 130. The female slot is configured to attach the bracket 130 to the column 120 by insertion of one of the plurality of male pegs into the female slot. The column support hole 124 lines up with the plug support hole 173 (shown in FIG. 4). A screw or any other appropriate fastening means then passes through both the plug support hole 173 and the column support hole 124 to stabilize the column 120.

Figure 7:
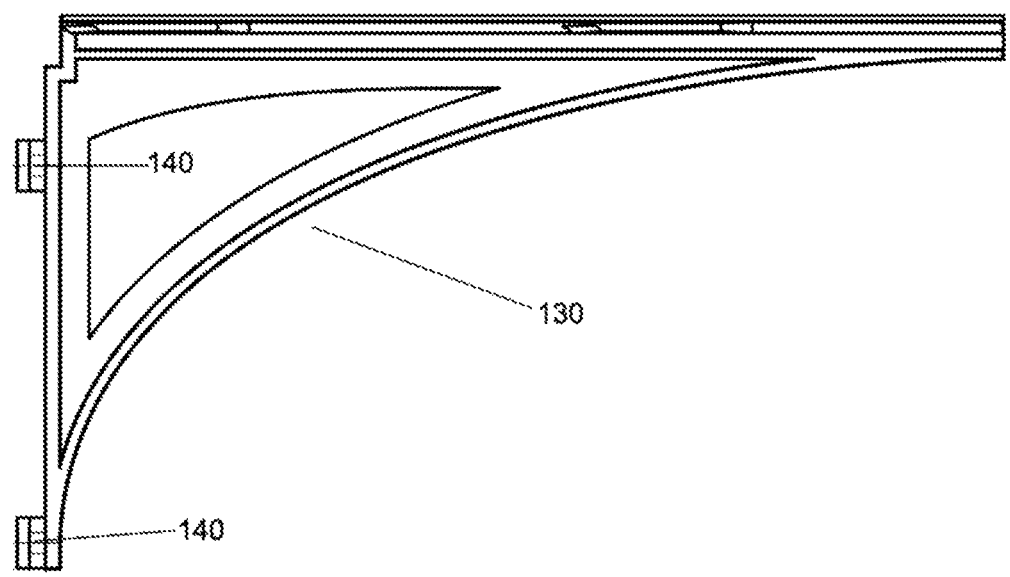
FIG. 7 is a side view of a bracket, according to an embodiment.

Referring now to the embodiment of FIG. 7, the plurality of attachment points 140 comprises female slots on the column 120 (shown in FIG. 6) and at least one male peg on the bracket 130. In the exemplary embodiment, there are two male pegs on the side of the bracket 130 that make contact with the column 120. The male pegs insert into the female slots to attach the bracket 130 to the column 120. As previously mentioned, in another embodiment, the column 120 has male pegs that insert into female slots on the brackets 130.

Figure 8:
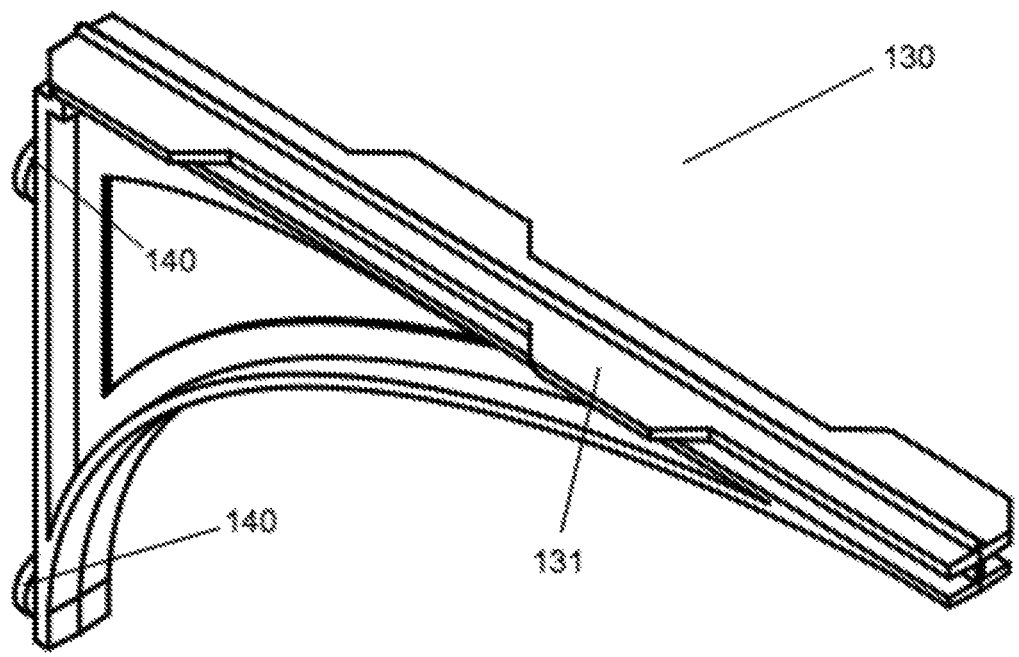
FIG. 8 is a tilted view of a bracket showing the sliding attachment, according to an embodiment.
Figure 9:
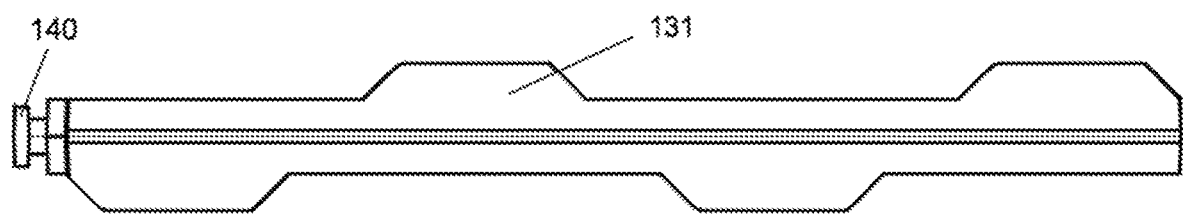
FIG. 9 is a bird's eye view of a bracket showing the sliding attachment, according to an embodiment.

Referring now to the embodiment of FIG. 8 and FIG. 9, the top of the bracket 130 comprises a sliding attachment 131. The sliding arrangement 131 of the bracket 130 corresponds to a receiving arrangement on the bottom surface of the accessory 150. The sliding arrangement 131 slides into the complementary receiving arrangement on the accessory 150 to lock the accessory 150 into place on the bracket 130. To remove the accessory 150, the accessory 150 slides off of the bracket 130. In the exemplary embodiment, the sliding arrangement 131 on the bracket 130 consists of alternating trapezoidal projections. However, the sliding arrangement can be any shape or configuration as long as it is complimentary to the receiving arrangement on the accessory 150. The complimentary arrangements allow the accessory to lock into place.

In another embodiment, the accessory 150 attaches directly to the column 120 without the use of a bracket 130. The plurality of attachment points 140 comprises a plurality of female slots in the column and a male peg on the accessory 150. The male peg is configured to attach the accessory 150 directly to the column 120 by insertion into one of the plurality of female slots. In another embodiment, the plurality of attachment points 140 comprises a plurality of male pegs on the column 120 and a female slot on the accessory 150. The female slot is configured to attach the accessory 150 directly to the column 120 by insertion of one of the plurality of male pegs into the female slot.

In the exemplary embodiment, the accessory 150 comprises a platform. In other embodiments, the accessory 150 comprises a coffee pod holder, tree mug holder, banana bunch holder, canister for storage, cookie jar, utensil holder, spice rack, paper towel holder, napkin holder, cereal container, cereal dispenser, ice bucket, wine bottle holder, wine glass holder, fruit bowl, pie/cake stand, triple tier stand, or cupcake stand. These options are presented as options and are not meant to be limiting. There can also be several of these accessories 150 mixed and matched together in one assembly 100.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved seal assemblies.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

| REFERENCE NUMBER LIST | |
| --- | --- |
| Reference Number | Part Name |
| 110 | Base |
| 111 | Top face |
| 112 | Bottom face |
| 113 | Central Opening |
| 114 | Base connection hole |
| 120 | Column |
| 121 | Top end |
| 122 | Cap |
| 123 | Bottom end |
| 124 | Column support hole |
| 130 | Bracket |
| 140 | Attachment points |
| 150 | Accessory |
| 160 | Turntable bearing |
| 161 | Nut |
| 162 | Tooth lock washer |
| 170 | Plug |
| 171 | Nut |
| 172 | Chamfered washer |

-continued

REFERENCE NUMBER LIST

| Reference Number | Part Name |
|---|---|
| 173 | Plug support hole |
| 174 | Plug connection hole |

What is claimed is:

1. An assembly comprising:
a base comprising a top face and a bottom face;
a turntable bearing attached to the bottom face of the base and configured to allow the base to rotate;
a column that is attached to the base, the column containing a plurality of attachment points;
one or more brackets, each configured to attach to the column at one or more of the plurality of attachment points respectively, wherein the one or more brackets are each cantilever-braced; and
an accessory attached to each of the one or more brackets,
wherein the column further comprises a top end and a bottom end, the bottom end extending through a central opening in the base, the bottom end being attached to a plug surrounding the bottom end, the plug attaching the column to the bottom face, wherein the plug is attached to the bottom face by a first washer and a first nut.

2. The assembly of claim 1, wherein a cap seals the top end of the column.

3. The assembly of claim 1, wherein the first washer and the first nut are made of steel.

4. The assembly of claim 1, wherein the plurality of attachment points comprises a plurality of female slots in the column and the bracket comprises a male peg, the male peg being configured to attach the bracket to the column by insertion into one of plurality of female slots.

5. The assembly of claim 1, wherein the base is circular.

6. The assembly of claim 1, wherein the column is a polygonal prism.

7. The assembly of claim 6, wherein:
the column comprises four vertical side walls forming the polygonal prism and the one or more brackets comprise:
a first bracket attached to a first vertical side wall and a first accessory is attached to the first bracket;
a second bracket attached to a second vertical side wall and a second accessory is attached to the second bracket;
a third bracket attached to a third vertical side wall and a third accessory is attached to the third bracket; and
a fourth bracket attached to a fourth vertical side wall and a fourth accessory is attached to the fourth bracket.

8. The assembly of claim 1, wherein the column is a cylindrical prism.

9. The assembly of claim 1, wherein the bracket is made of plastic.

10. The assembly of claim 1, wherein the base and the column are made of stainless steel.

11. The assembly of claim 1, wherein the base and the column are made of rolled steel.

12. The assembly of claim 1, wherein the base and the column are made of aluminum.

13. The assembly of claim 1, wherein the turntable bearing is made of plastic.

14. The assembly of claim 1, wherein the turntable bearing is attached to the bottom face of the base by a second nut and a second washer.

15. The turntable assembly of claim 14, wherein the second nut and the second washer are made of stainless steel.

16. The assembly of claim 1, wherein the accessory comprises a platform.

17. The assembly of claim 1, wherein the accessory comprises a mug holder.

18. An assembly comprising:
a base comprising a top face and a bottom face;
a turntable bearing attached to the bottom face of the base and configured to allow the base to rotate;
a column that is attached to the base, the column containing a plurality of attachment points, wherein the plurality of attachment points comprises a respective plurality of male pegs on the column and a female slot on each of one or more cantilever-braced brackets, the female slot being configured to attach the bracket to the column by insertion of one of the plurality of male pegs into the female slot;
an accessory attached to each of the one or more brackets,
wherein the column further comprises a top end and a bottom end, the bottom end extending through a central opening in the base, the bottom end being attached to a plug surrounding the bottom end, the plug attaching the column to the bottom face, wherein the plug is attached to the bottom face by a first washer and a first nut.

* * * * *